(12) United States Patent
Kaneko et al.

(10) Patent No.: US 11,383,535 B2
(45) Date of Patent: Jul. 12, 2022

(54) LIQUID EJECTING APPARATUS

(71) Applicant: SEIKO EPSON CORPORATION, Tokyo (JP)

(72) Inventors: Kenichiro Kaneko, Okaya (JP); Seijun Horie, Matsumoto (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 17/065,056

(22) Filed: Oct. 7, 2020

(65) Prior Publication Data

US 2021/0107300 A1    Apr. 15, 2021

(30) Foreign Application Priority Data

Oct. 10, 2019  (JP) .............................. JP2019-186601

(51) Int. Cl.
  *B41J 11/00*   (2006.01)
  *B65G 15/30*   (2006.01)
  *B41J 2/045*   (2006.01)

(52) U.S. Cl.
  CPC ......... *B41J 11/007* (2013.01); *B41J 2/04586* (2013.01); *B41J 11/008* (2013.01); *B65G 15/30* (2013.01)

(58) Field of Classification Search
  CPC .... B41J 2/0451; B41J 2/04586; B41J 11/007; B41J 11/008; B65G 15/30
  See application file for complete search history.

(56) References Cited

U.S. PATENT DOCUMENTS 7,316,477 B2 *  1/2008  Yoda .................... B41J 11/0025
                                                    271/198

FOREIGN PATENT DOCUMENTS

| JP | 2007-038518 | 2/2007 |
| JP | 2007-126252 | 5/2007 |
| JP | 2007-175907 | 7/2007 |
| JP | 2013-193237 | 9/2013 |

* cited by examiner

*Primary Examiner* — Thinh H Nguyen
(74) *Attorney, Agent, or Firm* — Workman Nydegger

(57) ABSTRACT

A liquid ejecting apparatus includes an endless transporting belt stretched over a plurality of rollers and configured to rotate while supporting a medium, by a support face that is a surface on an opposite side from a contact surface with the roller, to transport the medium in a transport direction, and a liquid ejecting unit configured to eject liquid onto the medium supported by the support face, wherein the transporting belt is formed without a coupling portion at which end portions of the transporting belt are coupled to each other along a width direction that intersects with a circumferential direction of the transporting belt.

5 Claims, 8 Drawing Sheets

LIQUID EJECTING APPARATUS

The present application is based on, and claims priority from JP Application Serial Number 2019-186601, filed Oct. 10, 2019, the disclosure of which is hereby incorporated by reference herein in its entirety.

BACKGROUND

1. Technical Field

The present disclosure relates to a liquid ejecting apparatus.

2. Related Art

In the past, a liquid ejecting apparatus that, while using an endless transporting belt stretched over a plurality of rollers to transport a medium, ejects liquid onto the medium has been used. For example, JP-A-2013-193237 discloses a liquid discharge device that, while using a transporting belt stretched over a belt-rotated roller and a belt driving roller to transport a recording medium, ejects ink from a discharging head onto the recording medium.

However, as in the liquid discharge device disclosed in JP-A-2013-193237, in a liquid ejecting apparatus of the related art that, while using an endless transporting belt stretched over a plurality of rollers to eject liquid on the recording medium, the transporting belt includes a coupling portion at which end portions of the transporting belt are coupled to each other along a width direction. The coupling portion is different from a part other than the coupling portion in a thickness, an extension percentage for tension, hardness, and the like, thus, there has been a possibility that deviation may occur in transport accuracy of the transporting belt between a case when the coupling portion is located at a position where the coupling portion contacts the roller, and a case when the coupling portion is not located at the position. Thus, an advantage of some aspects of the disclosure is to suppress deterioration in transport accuracy of a transporting belt.

SUMMARY

A liquid ejecting apparatus according to the present disclosure for solving the above-described problems includes a transporting belt having an endless shape stretched over a plurality of rollers and configured to rotate while supporting a medium, by a support face that is a surface on an opposite side from a contact surface with the roller, to transport the medium in a transport direction, and a liquid ejecting unit configured to eject liquid onto the medium supported by the support face, wherein the transporting belt is formed without a coupling portion at which end portions of the transporting belt are coupled to each other along a width direction that intersects with a circumferential direction of the transporting belt.

DESCRIPTION OF EXEMPLARY EMBODIMENTS

Figure 1:
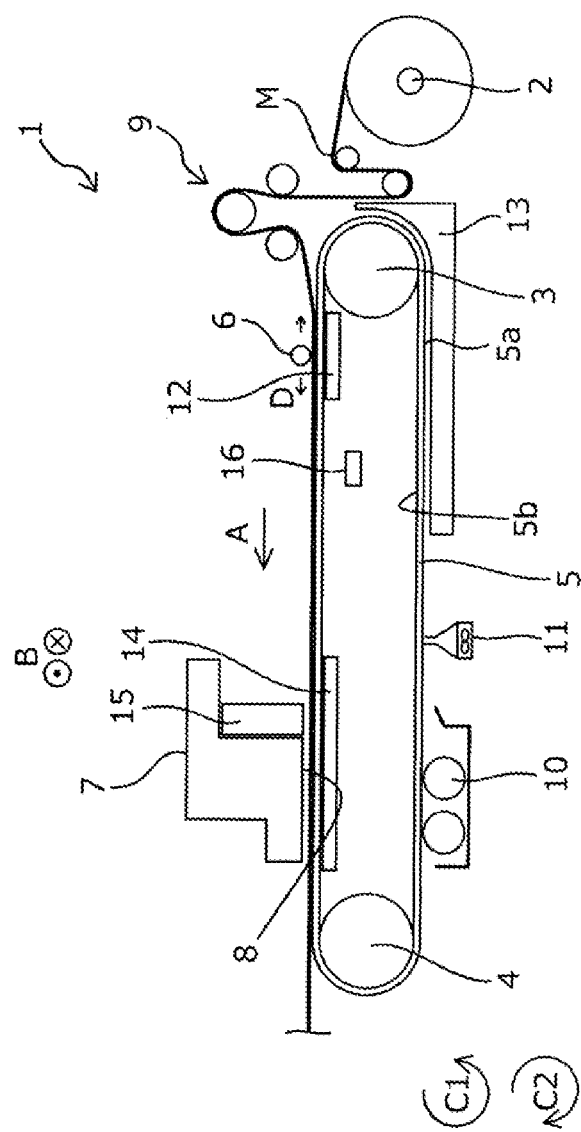
FIG. 1 is a schematic side view of a printing apparatus according to Example 1 of the present disclosure.

First, the present disclosure will be schematically described.

A liquid ejecting apparatus according to a first aspect of the present disclosure for solving the above-described problems includes an endless transporting belt stretched over a plurality of rollers and configured to rotate while supporting a medium, by a support face that is a surface on an opposite side from a contact surface with the roller, to transport the medium in a transport direction, and a liquid ejecting unit configured to eject liquid onto the medium supported by the support face, wherein the transporting belt is formed without a coupling portion at which end portions of the transporting belt are coupled to each other along a width direction that intersects with a circumferential direction of the transporting belt.

According to the present aspect, the transporting belt is formed without a coupling portion at which the end portions of the transporting belt are coupled to each other along the width direction that intersects with the circumferential direction of the transporting belt. Thus, it is possible to suppress occurrence of both a case when the coupling portion is located at a position where the coupling portion contacts the roller, and a case when the coupling portion is not located at the position where the coupling portion contacts the roller. Thus, it is possible to suppress occurrence of deviation in transport accuracy due to placement of the transporting belt, and deterioration in the transport accuracy due to the transporting belt can be suppressed.

A liquid ejecting apparatus according to a second aspect of the present disclosure is the first aspect, wherein the transporting belt is formed by a plurality of endless constituent belts without the coupling portion arranged side-by-side in the width direction and stretched over the plurality of rollers.

According to the present aspect, the transporting belt is formed by arranging the plurality of endless constituent belts side-by-side in the width direction. While it may be difficult to form a wide endless belt without a coupling portion along a width direction, it is possible to avoid difficulties in forming a transporting belt, by adopting a configuration in which narrow endless belts without a coupling portion are arranged side-by-side along the width direction in this manner.

A liquid ejecting apparatus according to a third aspect of the present disclosure is the second aspect, wherein the plurality of endless constituent belts arranged side-by-side in the width direction are coupled to each other.

According to the present aspect, the constituent belts are coupled to each other along the circumferential direction, and thus shifting of movement between the constituent belts can be suppressed.

A liquid ejecting apparatus according to a fourth aspect of the present disclosure is the third aspect, wherein the constituent belts are coupled to each other by thermal welding.

According to the present aspect, since the coupling is performed with a single material, for example, a difference in coefficient of thermal expansion generated by using different materials can be suppressed, and occurrence of coupling defects between the constituent belts and the like can be suppressed.

A liquid ejecting apparatus according to a fifth aspect of the present disclosure is the third aspect, wherein the constituent belts are coupled to each other by using an adhesive.

According to the present aspect, a preferable adhesive can be selected and used depending on a stock shape of the constituent belt or the like, so the coupling can be easily performed.

A liquid ejecting apparatus according to a sixth aspect of the present disclosure is any one of the third to fifth aspects, further including a platen configured to support the transporting belt from a side of the contact surface, wherein the platen is formed with a groove portion along the circumferential direction for avoiding contact with a coupling portion between the endless constituent belts.

According to the present aspect, the platen is formed with the groove portion along the circumferential direction for avoiding contact with the coupling portion, thus, even when the coupling portion swells compared to a non-coupling portion, by relieving the swell of the coupling portion using the groove portion, generation of unevenness on the medium supported by the transporting belt can be suppressed.

A liquid ejecting apparatus according to a seventh aspect of the present disclosure is any one of the third to fifth aspects, further including a carriage configured to reciprocate the liquid ejecting unit along the width direction, and a control unit configured to control ejection timing of the liquid from the liquid ejecting unit, wherein the control unit can adjust ejection timing of the liquid in a coupling portion support region of the medium supported by the coupling portion, with respect to ejection timing of the liquid in a non-coupling portion support region of the medium supported by other part than the coupling portion.

According to the present aspect, by adjusting ejection timing of the liquid, even when the coupling portion swells compared to the non-coupling portion, by adjusting ejection timing corresponding to the swell of the coupling portion, it is possible to suppress occurrence of a shift of an ejection position of the liquid with respect to the medium.

Example 1

Embodiments according to the present disclosure will be described below with reference to the accompanying drawings. First, an overview of a liquid ejecting apparatus 1 according to Example 1 of the present disclosure will be described with reference to FIG. 1.

As illustrated in FIG. 1, the liquid ejecting apparatus 1 according to this example includes a transporting belt 5 capable of rotating in a rotation direction C1 to transport a medium M in a transport direction A. Further, a dispenser part 2 on which the medium M that is a roll type is set and that is capable of rotating in the rotation direction C1 to feed the medium M is provided. The transporting belt 5 is configured such that the medium M fed from the dispenser part 2 via a roller group 9 can be transported in the transport direction A. The transporting belt 5 is an endless belt stretched over a driven roller 3 located upstream in the transport direction A, and a driving roller 4 located downstream in the transport direction A.

Here, the transporting belt 5 is an adhesive belt in which an adhesive is applied to a support face 5a that is an outer surface. As illustrated in FIG. 1, the medium M is supported and transported by the transporting belt 5 in a state where the medium M is affixed to the support face 5a to which the adhesive is applied. A region over which the transporting belt 5 supports the medium M is an upper-side region stretched between the driven roller 3 and the driving roller 4. The driving roller 4 is a roller that rotates under driving force from a motor, which is not illustrated, and the driven roller 3 is a roller that rotates in response to the rotation of the transporting belt 5 when the driving roller 4 is rotated.

The medium M fed from the roller group 9 to the transporting belt 5 is pressed by a press roller 6 and is affixed to the support face 5a. The press roller 6 is extended in a width direction B that intersects with the transport direction A, and is movable in a movement direction D along the transport direction A. In addition, a configuration is adopted in which a platen 12 is provided on a lower portion in a movement range of the press roller 6 via the transporting belt 5, and by moving the press roller 6 in the movement direction D while pressing the press roller 6 toward the platen 12 with the medium M and the transporting belt 5 interposed therebetween, the medium M can be securely affixed to the support face 5a. That is, the medium M is affixed to the transporting belt 5, in a state where generation of wrinkles and the like is suppressed, by the press roller 6 pressing the medium M against the transporting belt 5 across the width direction B.

In addition, the liquid ejecting apparatus 1 includes a carriage 7 capable of reciprocating in the width direction B along a carriage shaft 15 extended in the width direction B, and a head 8 as a liquid ejecting unit attached to the carriage 7. The head 8 ejects ink that is liquid on the medium M transported in the transport direction A. A platen 14 is provided in a region facing the head 8 via the transporting belt 5. By supporting the transporting belt 5 by the platen 14 in the region facing the head 8, vibration of the transporting belt 5 in the region facing the head 8 can be suppressed, so that a landing position of ink ejected from the head 8 is not shifted, and image quality does not deteriorate.

As described above, the liquid ejecting apparatus 1 according to this example is capable of forming an image by ejecting ink from the head 8 onto the transported medium M while reciprocating the carriage 7 in the width direction B, which intersects with the transport direction A. By including the carriage 7 configured in this manner, the liquid ejecting apparatus 1 according to this example forms a desired image on the medium M by repeating the transport of the medium M in the transport direction A by a predetermined transport amount, and the ejection of the ink while moving the carriage 7 in the width direction B while the medium M is stopped.

Note that, the liquid ejecting apparatus 1 according to this example is a so-called serial printer configured to alternately repeat the transport of the medium M by the predetermined amount, and the reciprocation of the carriage 7 to perform printing, but may be a so-called line printer configured to use a line head formed with nozzles in a line shape along the width direction B of the medium M, to continuously transport the medium M, and to continuously perform printing.

Upon being ejected from the liquid ejecting apparatus 1 according to this example, the medium M on which an image is formed is fed to a drying apparatus that volatilizes volatile components in the ink ejected onto the medium M, a winding apparatus that winds up the medium M on which the image is formed, and the like provided in stages following the liquid ejecting apparatus 1 according to this example.

Here, a printable material is preferably used as the medium M. The term "printable material" refers to a fabric, a garment, and other clothing products which can be printed. Fabrics includes natural fibers such as cotton, silk and wool, chemical fibers such as nylon, or composite fibers of natural fibers and chemical fibers such as woven cloths, knit fabrics, and non-woven cloths. Garments and other clothing products include sewn products, such as a T-shirt, handkerchief, scarf, towel, handbag, fabric bag, and furniture-related products including a curtain, sheet, and bed cover, as well as fabric before and after cutting to serve as pieces of cloth before sewing.

Furthermore, in addition to the printable material described above, the medium M may be special paper for inkjet printing, such as plain paper, pure paper, or glossy paper. Other materials that can be used as the medium M include, for example, plastic films without a surface treatment applied to serve as an ink absorption layer for inkjet printing, as well as substrates such as paper being applied a plastic coating and substrates being bonded a plastic film. Such plastic materials include, but are not limited to, for example, polyvinyl chloride, polyethylene terephthalate, polycarbonate, polystyrene, polyurethane, polyethylene, and polypropylene.

When a printable material is used as the medium M, the printable material is likely to be subjected to ink strike-through that is a phenomenon where the ink ejected onto the medium M bleeds through to a rear surface of the medium, and there are therefore cases where the transporting belt 5 is soiled by ink. Accordingly, the liquid ejecting apparatus 1 according to this example is provided with a cleaning section 10 configured to clean strike-through ink attached to the support face 5a of the transporting belt 5. The cleaning section 10 includes a cleaning brush in which cleaning liquid is immersed and that contacts the support face 5a. Further, an air blowing unit 11 is provided for removing the cleaning liquid attached to the support face 5a by bringing the cleaning brush into contact with the support face 5a, by blowing air. Furthermore, the liquid ejecting apparatus 1 according to this example includes a support face heating unit 13 capable of heating and drying the cleaning liquid that is not completely removed by the air blowing unit 11.

The liquid ejecting apparatus 1 according to this example is capable of rotating the driving roller 4 in the rotation direction C1 to transport the medium M in the transport direction A. Additionally, the liquid ejecting apparatus 1 according to this example is also capable of rotating the driving roller 4 in a rotation direction C2, that is a reverse direction of the rotation direction C1 to transport the medium M in a reverse direction of the transport direction A.

Next, the transporting belt 5, that is a main part of the liquid ejecting apparatus 1 according to this example, will be described below with reference to FIG. 2 to FIG. 4 and FIG. 8 illustrating the transporting belt 5 used in a liquid ejecting apparatus of the related art as a reference example. First, the transporting belt 5 used in the liquid ejecting apparatus of the related art will be described with reference to FIG. 8.

Figure 8:
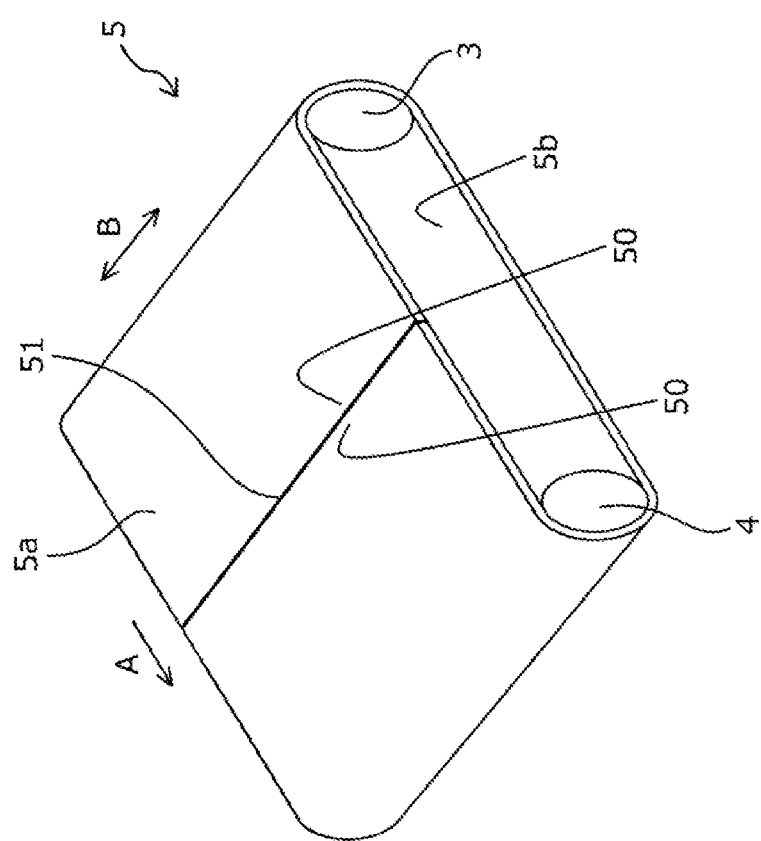
FIG. 8 is a schematic perspective view illustrating a transporting belt of a printing apparatus according to a reference example.

As illustrated in FIG. 8, in the transporting belt 5 of the related art, a coupling portion 51 between end portions 50 was provided along the width direction B. In other words, the endless transporting belt 5 was manufactured by making a sheet-like material annular and coupling the end portions 50 to each other. In the transporting belt 5 of the related art, the endless transporting belt 5 was manufactured in this manner, and the coupling portion 51 was provided along the width direction B, thus, a case when the coupling portion 51 is located at a contact position where the coupling portion 51 contacts the driven roller 3 and the driving roller 4, and a case when the coupling portion 51 is located at a non-contact position where the coupling portion 51 does not contact the driven roller 3 and the driving roller 4 occurred. However, the coupling portion 51 and a non-coupling portion 52 that is a part other than the coupling portion 51 are different from each other in extension percentage of the transporting belt 5 when fixed tensile force is applied, and the like. In particular, when the transporting belt 5 having an aramid core wire with a small coefficient of thermal expansion is used for a purpose of reducing a coefficient of thermal expansion, or the like, a difference in the extension percentage of the transporting belt 5 when fixed tensile force is applied is significant between the coupling portion 51 and the non-coupling portion 52. Thus, a change in displacement of the transporting belt 5 with respect to a unit rotation amount of the driven roller 3 and the driving roller 4 occurred in some cases, between the case when the coupling portion 51 is located at the contact position and the case when the coupling portion 51 is located at the non-contact position.

Figure 4:
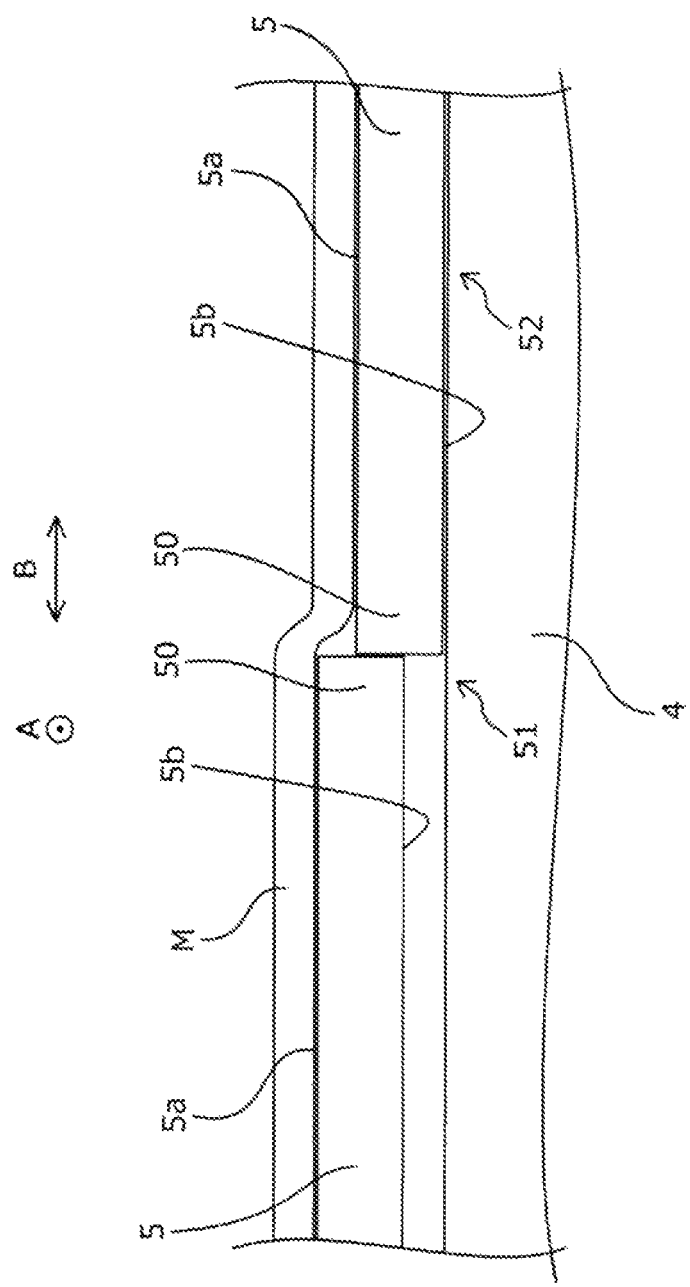
FIG. 4 is a schematic front cross-sectional view illustrating the coupling portion in the transporting belt in FIG. 2.

Here, FIG. 4 is an example of the coupling portion 51 of the transporting belt 5 of the liquid ejecting apparatus 1 according to this example, but the configuration thereof is similar to that of the coupling portion 51 of the transporting belt 5 of the liquid ejecting apparatus of the related art except for a coupling direction of the coupling portion 51, and thus, with reference to FIG. 4, for example, as illustrated in FIG. 4, the end portions 50 were shifted and coupled to each other, in the coupling portion 51, in some cases. In this manner, when the end portions 50 are shifted and coupled at the coupling portion 51, a difference in the displacement of the transporting belt 5 with respect to the unit rotation amount of the driven roller 3 and the driving roller 4 may be increased, between the case when the coupling portion 51 is located at the contact position and the case when the coupling portion is located at the non-contact position. Thus, in the liquid ejecting apparatus provided with the transporting belt 5 of the related art as illustrated in FIG. 8, variation occurred in the displacement of the transporting belt 5 between the case when the coupling portion 51 is located at the contact position and the case when the coupling portion is located at the non-contact position, and transport accuracy of the medium M deteriorated, in some cases.

Figure 2:
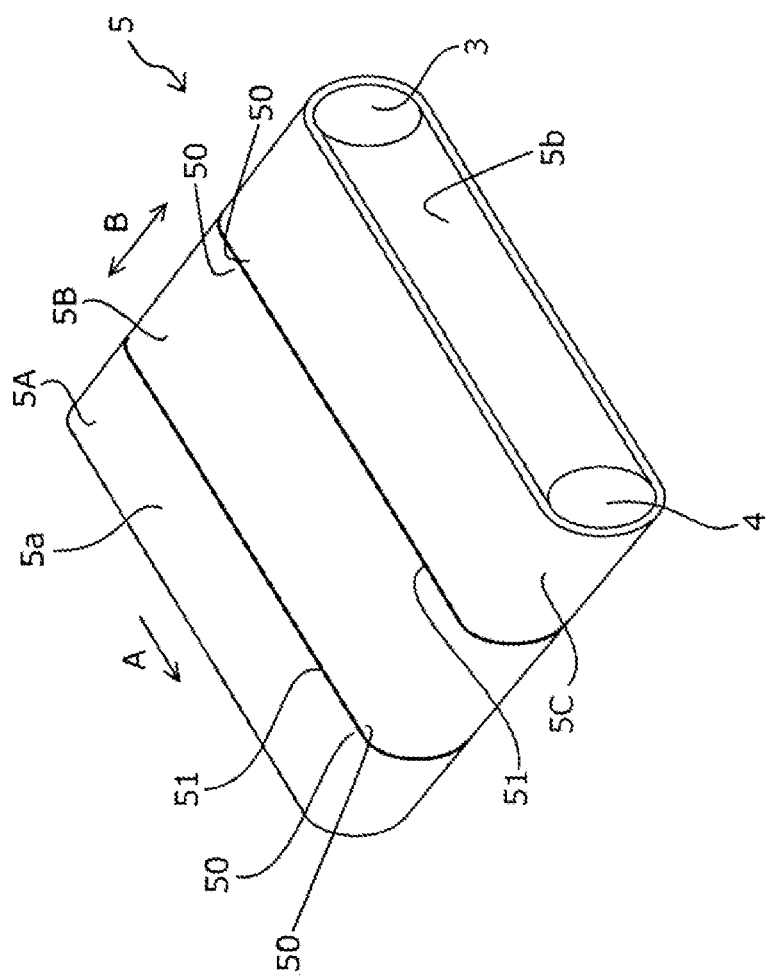
FIG. 2 is a schematic perspective view illustrating a transporting belt of the printing apparatus in FIG. 1.

On the other hand, as illustrated in FIG. 2, in the liquid ejecting apparatus 1 according to this example, the coupling portion 51 between the end portions 50 is provided along the transport direction A. In other words, the coupling portion 51 between the end portions 50 contacts the driven roller 3 and the driving roller 4 in a fixed state, in any of the above cases regarding to the arrangement of the transporting belt 5 with respect to the driven roller 3 and the driving roller 4. That is, since the state where the coupling portion 51 is located at the contact position does not change to the state where the coupling portion 51 is located at the non-contact position, or vice versa, the occurrence of variation in the displacement of the transporting belt 5 is suppressed, and the deterioration in the transport accuracy of the medium M is suppressed.

In other words, as described above, the liquid ejecting apparatus 1 according to this example includes the endless transporting belt 5 stretched over the driven roller 3 and the driving roller 4 as a plurality of the rollers and configured to rotate in the rotation direction C1 while supporting the medium M, by the support face 5a that is the surface on the opposite side from the contact surface 5b with the driven roller 3 and the driving roller 4, to transport the medium M in the transport direction A, and the head 8 configured to eject ink onto the medium M supported by the support face 5a, but the transporting belt 5 according to this example is formed without the coupling portion 51 at which end portions 50 of the transporting belt 5 are coupled to each other along the width direction B that intersects with the circumferential direction of the transporting belt 5. Thus, the liquid ejecting apparatus 1 according to this example can suppress occurrence of both the case when the coupling portion 51 is located at the position where the coupling portion 51 contacts the roller, and the case when the coupling portion 51 is not located at the position where the coupling portion 51 contacts the roller. Thus, the liquid ejecting apparatus 1 according this example can suppress occurrence of the deviation in the transport accuracy due to the placement of the transporting belt 5, and the deterioration in the transport accuracy due to the transporting belt 5 can be suppressed.

In addition, as illustrated in FIG. 2, the transporting belt 5 according to this example is formed by a plurality of endless constituent belts 5A, 5B, and 5C without the coupling portion 51, that are arranged side-by-side in the width direction B, and stretched over the driven roller 3 and the driving roller 4. While it may be difficult to form a wide endless belt without the coupling portion 51 along the width direction B, it is possible to avoid difficulties in forming the transporting belt 5, by adopting a configuration in which narrow endless belts without the coupling portions 51 are arranged side-by-side along the width direction B in this manner.

Furthermore, in the transporting belt 5 according to this example, the plurality of endless constituent belts 5A, 5B, and 5C arranged side-by-side in the width direction B are coupled to each other. In the transporting belt 5 according to this example, the constituent belts 5A, 5B, and 5C are coupled to each other along a circumferential direction, thus shifting of movement between the constituent belts 5A, 5B, and 5C can be suppressed.

Here, in the transporting belt 5 according to this example, the constituent belts 5A, 5B, and 5C are coupled to each other by thermal welding. When the coupling is performed by the thermal welding, the coupling can be performed with a single material, thus for example, a difference in coefficient of thermal expansion generated by using different materials can be suppressed, and occurrence of coupling defects between the constituent belts 5A, 5B, and 5C, and the like can be suppressed.

However, the present disclosure is not limited to the coupling configuration described above. An adhesive may be used to couple the constituent belts 5A, 5B, and 5C to each other. When the constituent belts 5A, 5B, and 5C are coupled by using an adhesive, a preferable adhesive can be selected and used depending on a stock shape of the constituent belts 5A, 5B, and 5C, and the like, and thus the coupling can be easily performed. Note that, "coupling using an adhesive" means not only application of an adhesive to the respective end portions 50 of the constituent belts 5A and 5B, or 5B and 5C for affixing, but also using a tape to which an adhesive is applied for affixing, or the like.

Figure 3:
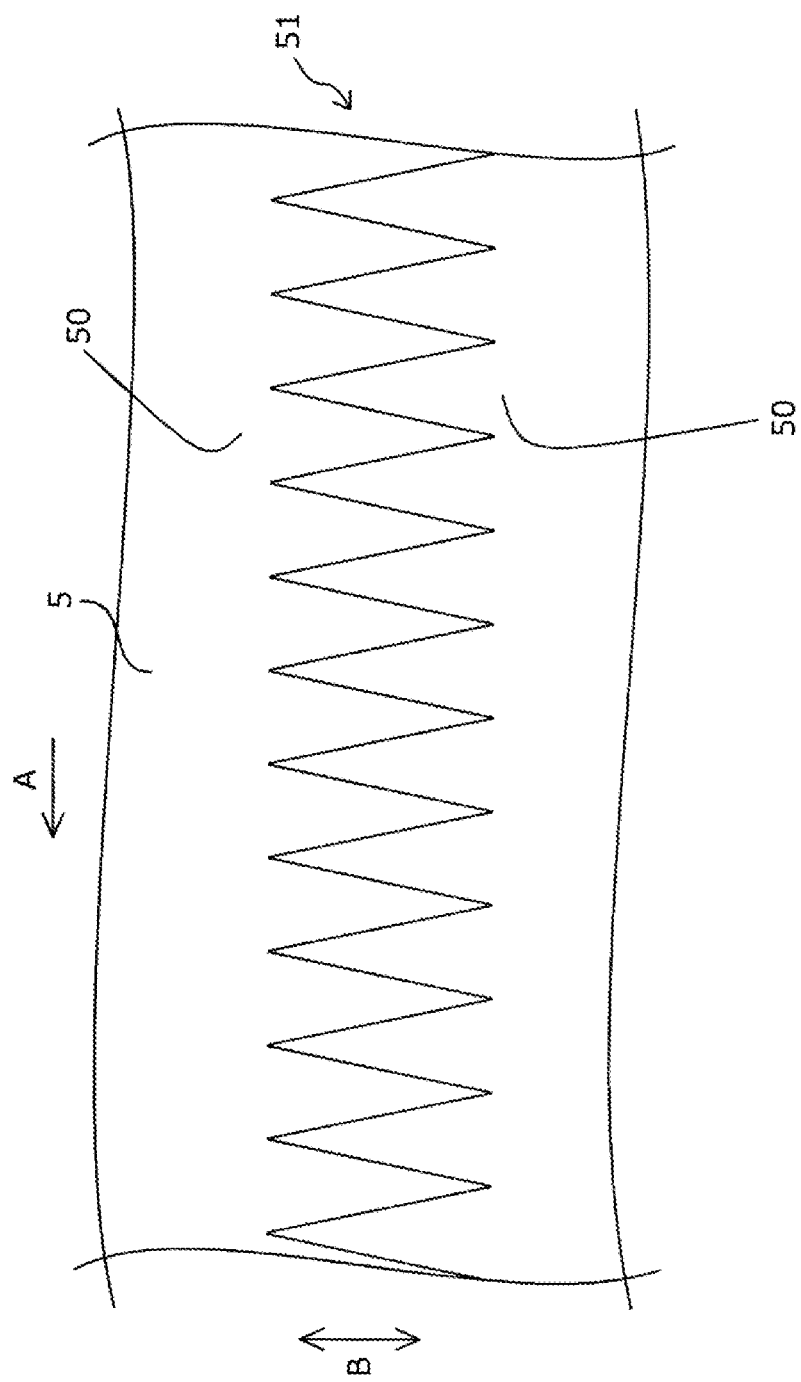
FIG. 3 is a schematic plan view illustrating a coupling portion in the transporting belt in FIG. 2.

In the transporting belt 5 according to this example, specifically, as illustrated in FIG. 3, at the coupling portion 51, the respective end portions 50 of the constituent belts 5A and 5B, or 5B and 5C are coupled to each other by the thermal welding, in a state of being coupled in a zig-zag manner in plan view. By configuring the coupling portion 51 as described above, a contact area between the respective end portions 50 of the constituent belts 5A and 5B, or 5B and 5C can be increased, and strength of the coupling portion 51 is increased.

Figure 5:
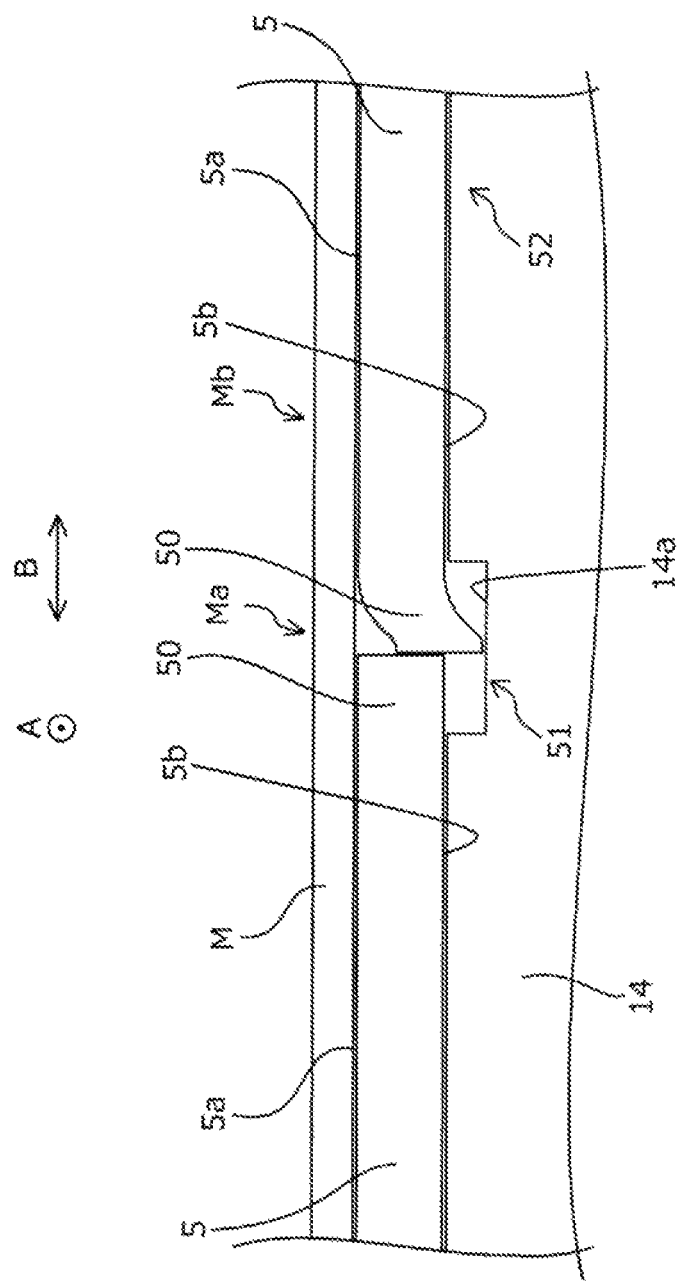
FIG. 5 is a schematic front cross-sectional view illustrating the coupling portion and a platen in the transporting belt in FIG. 2.

Furthermore, as described above, the liquid ejecting apparatus 1 according to this example includes the platen 14 that supports the transporting belt 5 from a side the contact surface 5b, however, as illustrated in FIG. 5, a groove 14a is provided at a position facing the coupling portion 51 along the transport direction A, in the platen 14. Note that, although not illustrated in the figure, the platen 12, as well as the platen 14, is also provided with a groove at a position facing the coupling portion 51 along the transport direction A. In other words, a groove portion along the circumferential direction of the transporting belt 5 is formed in each of the platens 12 and 14 in the liquid ejecting apparatus 1 according to this example, in order to avoid contact with the coupling portion 51 of each of the endless constituent belts 5A, 5B, and 5C. As described above, the groove portion such as the groove 14a along the circumferential direction for avoiding contact with the coupling portion 51 is formed in each of the platens 12 and 14 of the liquid ejecting apparatus 1 according to this example, thus, even when the coupling portion 51 swells compared to the non-coupling portion 52 that is a region of the transporting belt 5 other than the coupling portion 51, by relieving the swelling of the coupling portion 51 using the groove portion, generation of unevenness on the medium M supported by the transporting belt 5 can be suppressed.

Additionally, as illustrated in FIG. 1, the liquid ejecting apparatus 1 according to this example includes the carriage 7 for reciprocating the head 8 along the width direction B, and the control unit 16 for controlling ejection timing of ink from the head 8. Then, the control unit 16 is capable of adjusting ejection timing of ink in a coupling portion support region Ma of the medium M illustrated in FIG. 5 supported by the coupling portion 51, with respect to ejection timing of ink in a non-coupling portion support region Mb of the medium M illustrated in FIG. 5 supported by the non-coupling portion 52. The liquid ejecting apparatus 1 according to this example, by adjusting ejection timing of ink, even when the coupling portion 51 swells compared to the non-coupling portion 52, by adjusting ejection timing corresponding to the swelling of the coupling portion 51, it is possible to suppress occurrence of a shift of an ejection position of the ink with respect to the medium M.

Example 2

Figure 6:
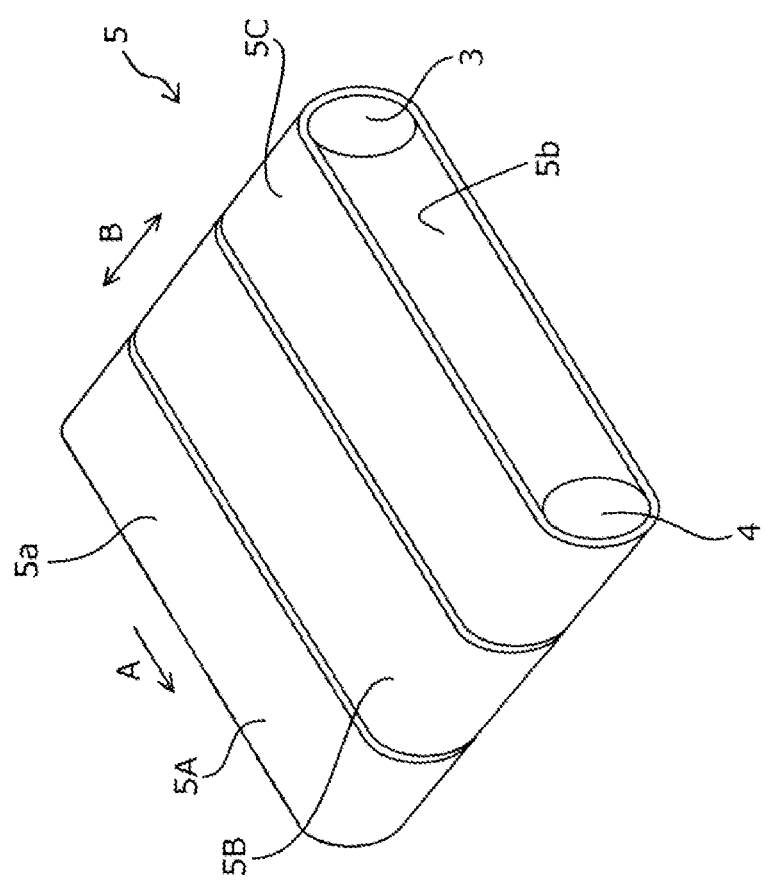
FIG. 6 is a schematic perspective view illustrating a transporting belt of a printing apparatus according to Example 2 of the present disclosure.

Next, the liquid ejecting apparatus 1 according to Example 2 will be described using FIG. 6. Note that, the constituent members in FIG. 6 common to those in Example 1 described above are denoted by the same reference numerals, and the detailed description will be omitted. Here, aside from the configuration of the transporting belt 5, the liquid ejecting apparatus 1 according to this example has a similar shape to that of the liquid ejecting apparatus 1 according to Example 1.

As described above, in the transporting belt 5 according to Example 1, the plurality of endless constituent belts 5A, 5B, and 5C without the coupling portion 51 at which the end portions 50 are coupled to each other along the width direction B are arranged side-by-side along the width direction B, and the constituent belts 5A, 5B, and 5C are coupled to each other by the thermal welding. On the other hand, as illustrated in FIG. 6, in the transporting belt 5 according to this example, it is common that the plurality of endless constituent belts 5A, 5B, and 5C without the coupling portion 51 at which the end portions 50 are coupled to each other are arranged side-by-side in the width direction B, but the constituent belts 5A, 5B, and 5C are not coupled to each other. As described above, a configuration can be obtained that does not include not only the coupling portion 51 along the width direction B, but also even the coupling portion 51 along the circumferential direction of the transporting belt 5.

Example 3

Figure 7:
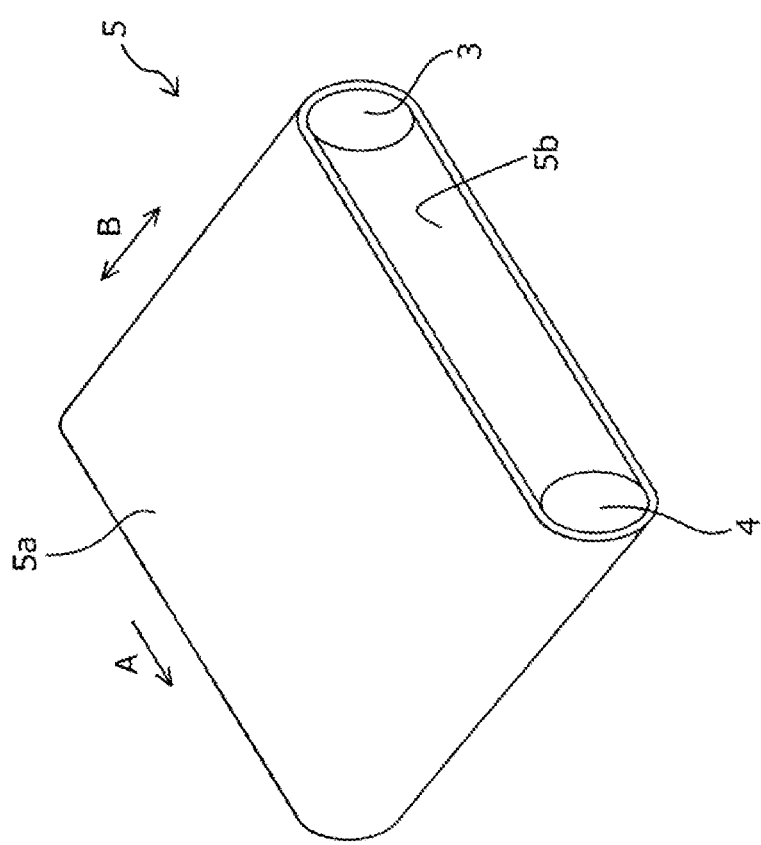
FIG. 7 is a schematic perspective view illustrating a transporting belt of a printing apparatus according to Example 3 of the present disclosure.

Next, the liquid ejecting apparatus 1 according to Example 3 will be described using FIG. 7. In FIG. 7, like numbers designate identical or corresponding component elements in Example 1 and Example 2 described above, and detailed description for such component elements are omitted. Here, aside from the configuration of the transporting belt 5, the liquid ejecting apparatus 1 according to this example has a similar shape to that of the liquid ejecting apparatus 1 according to each of Example 1 and Example 2.

As described above, the transporting belt 5 according to each of Example 1 and Example 2 is configured by arranging the plurality of endless constituent belts 5A, 5B, and 5C without the coupling portion 51 at which the end portions 50 are coupled to each other along the width direction B, side-by-side in the width direction B. On the other hand, as illustrated in FIG. 7, the transporting belt 5 according to this example is constituted by one endless constituent belt without the coupling portions 51 at which the end portions 50 are coupled to each other along the width direction B. As described above, a configuration can also be obtained that does not include not only the coupling portion 51 along the width direction B, but also even the coupling portion 51 along the circumferential direction of the transporting belt 5.

Note that the disclosure is not limited to the aforementioned example, and many variations are possible within the scope of the disclosure as described in the appended claims. It goes without saying that such variations also fall within the scope of the disclosure.

What is claimed is:

1. A liquid ejecting apparatus, comprising:
a transporting belt having an endless shape stretched over a plurality of rollers and configured to rotate while supporting a medium, by a support face that is a surface on an opposite side from a contact surface with the roller, to transport the medium in a transport direction; and
a liquid ejecting unit configured to eject liquid onto the medium supported by the support face, wherein
the transporting belt is formed without a coupling portion at which end portions of the transporting belt are coupled to each other along a width direction that intersects with a circumferential direction of the transporting belt,
the transporting belt is formed by a plurality of constituent belts having an endless shape without the coupling portion that are arranged side-by-side in the width direction and stretched over the plurality of rollers, and
the plurality of constituent belts having an endless shape arranged side-by-side in the width direction are coupled to each other by a second coupling portion that couples ends of the transporting belt in a width direction.

2. The liquid ejecting apparatus according to claim 1, comprising:
a platen configured to support the transporting belt from a side of the contact surface, wherein
the platen is formed with a groove portion along the circumferential direction for avoiding contact with the second coupling portion between the plurality of constituent belts having an endless shape.

3. A liquid ejecting apparatus, comprising:
a transporting belt having an endless shape stretched over a plurality of rollers and configured to rotate while supporting a medium, by a support face that is a surface on an opposite side from a contact surface with the roller, to transport the medium in a transport direction; and
a liquid ejecting unit configured to eject liquid onto the medium supported by the support face, wherein
the transporting belt is formed without a coupling portion at which end portions of the transporting belt are coupled to each other along a width direction that intersects with a circumferential direction of the transporting belt,
the transporting belt is formed by a plurality of constituent belts having an endless shape without the coupling portion that are arranged side-by-side in the width direction and stretched over the plurality of rollers,
the plurality of constituent belts having an endless shape arranged side-by-side in the width direction are coupled to each other, and
the plurality of constituent belts are coupled to each other by thermal welding.

4. A liquid ejecting apparatus, comprising:
a transporting belt having an endless shape stretched over a plurality of rollers and configured to rotate while supporting a medium, by a support face that is a surface on an opposite side from a contact surface with the roller, to transport the medium in a transport direction; and
a liquid ejecting unit configured to eject liquid onto the medium supported by the support face, wherein
the transporting belt is formed without a coupling portion at which end portions of the transporting belt are coupled to each other along a width direction that intersects with a circumferential direction of the transporting belt,
the transporting belt is formed by a plurality of constituent belts having an endless shape without the coupling portion that are arranged side-by-side in the width direction and stretched over the plurality of rollers,
the plurality of constituent belts having an endless shape arranged side-by-side in the width direction are coupled to each other, and
the plurality of constituent belts are coupled to each other by using an adhesive.

5. A liquid ejecting apparatus, comprising:
a transporting belt having an endless shape stretched over a plurality of rollers and configured to rotate while supporting a medium, by a support face that is a surface on an opposite side from a contact surface with the roller, to transport the medium in a transport direction;
a liquid ejecting unit configured to eject liquid onto the medium supported by the support face;
a carriage configured to reciprocate the liquid ejecting unit along the width direction; and
a control unit configured to control ejection timing of the liquid from the liquid ejecting unit, wherein
the transporting belt is formed without a coupling portion at which end portions of the transporting belt are coupled to each other along a width direction that intersects with a circumferential direction of the transporting belt, the transporting belt is formed by a plurality of constituent belts having an endless shape without the coupling portion that are arranged side-by-side in the width direction and stretched over the plurality of rollers, the plurality of constituent belts having an endless shape arranged side-by-side in the width direction are coupled to each other, and the control unit is configured to adjust ejection timing of the liquid in a coupling portion support region of the medium supported by the coupling portion, with respect to ejection timing of the liquid in a non-coupling portion support region of the medium supported by other part than the coupling portion.

* * * * *